2,888,350
PRUNE PACKAGE

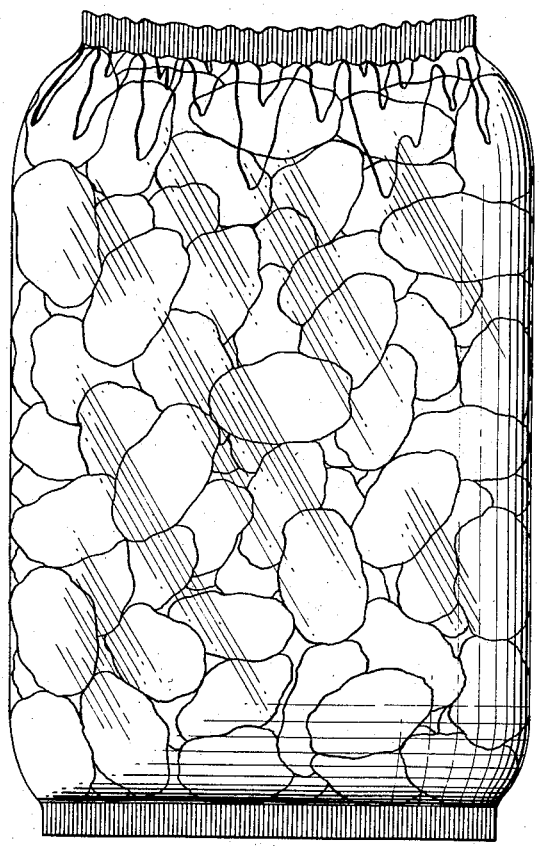

James E. Snyder, Akron, George W. Ferner, Cuyahoga Falls, and Irene Collins, Akron, Ohio, assignors to The Goodyear Tire & Rubber Company, Akron, Ohio, a corporation of Ohio Application October 11, 1956, Serial No. 615,355

8 Claims. (Cl. 99—171)

This invention relates to packaging prunes and other dried fruits which may exude minute droplets of syrup. It includes the package and transparent film used in making the package.

During the packaging of such dried fruits in transparent film containers such as bags, or in the subsequent handling of the bags, the syrupy droplets which are deposited on the inner surface of the wrapper become smeared over the surface. Such smears are objectionable to the purchaser in a self-service or other store.

The film of this invention contains an additive, herein sometimes called a syrup coalescent, which causes such syrupy deposits to coalesce into a continuous clear liquid film on the surface of the wrapper, thereby making the package more attractive to the housewife or the purchaser.

The preferred syrup coalescent is Non-ionic #1261, made by Sharples Chemical Company of Philadelphia, Pennsylvania, and which is purified or deodorized "Nonic #260." The manufacturers state that the latter is polyethyleneglycol tert-dodecyl-thioether of molecular weight in the range of 422–462. The odor may be removed as by passing nitrogen through Nonic #260 under reduced pressure. The purified or deodorized material is a clear yellow liquid with a flash point of substantially 190° F. and substantially the aforesaid molecular weight. It has a moisture content of no more than 2 percent. It is a non-ionic surface-active agent which is used primarily as an oil-in-water emulsifier.

Other syrup coalescents are Alrosol marketed by Geigy Chemical Company; Sellogen O-245 marketed by Jacques, Wolf & Co. of Passaic, New Jersey; Alkaterge C marketed by Commercial Solvents Company of New York; and Michelen DLD marketed by M. Michel & Co. of Jersey City, New Jersey. A small amount of such an additive, e.g., 2 or 3 percent up to 5 percent on the rubber hydrochloride, causes the syrup droplets or smear on the surface of the film to coalesce into a thin film which spreads evenly on the wrapper surface.

The film of this invention is essentially a rubber hydrochloride film. Normally it contains plasticizer which improves its strength and by making it more flexible, improves its handling during the packaging operation.

The film of this invention may contain a fugitive plasticizer in addition to a permanent plasticizer. The fugitive plasticizer gives strength to the film during the packaging operation, and although it decreases the resistance of the film to passage of moisture vapor during the packaging operation, this is not too important. The fugitive plasticizer vaporizes soon after the package is completed, so that the film has high resistance to the passage of moisture vapor during storage. Because of the loss of the fugitive plasticizer, the film has reduced strength during storage. This is of little importance, strength being required mainly during the packaging operation and in transporting the package. The fugitive plasticizers are non-toxic plasticizers which have a relatively high vapor pressure. Those having a boiling point of approximately 220° C. and lower are effective. Diisobutyl adipate has been found quite satisfactory. The permanent plasticizer content will advantageously be 5 to 12 parts on 100 parts of the rubber hydrochloride, and the fugitive plasticizer content may be 0 to 7 parts.

The film may also contain anti-blocking agents in the amounts customarily employed.

The invention is illustrated in the accompanying drawing which shows a bag of transparent film containing prunes.

The bag is made from film in the ordinary way, as by folding a single sheet and sealing the edges, or first forming a tube and then forming individual bags from the tube. A preferred film is formed by adding to 100 parts of rubber hydrochloride in benzene or other suitable solvent, 7.5 parts of butyl stearate, 5 parts of diisobutyl adipate, 2.5 parts of the syrup coalescent, and whatever anti-blocking agent, etc. are desired. The film composition in solvent is then spread on a moving belt or other suitable surface, and on evaporation of the solvent the film is obtained.

Film containing permanent plasticizer, but no volatile plasticizer, is also satisfactory. A film made from 100 parts RHCl, 10 parts butyl stearate, and 2 parts Non-ionic #1261 is highly effective as a non-smearing dried-fruit wrap.

A film .0012 to .0020 inch thick is used in this type of package. Usually more of the syrup coalescent deposits on the "belt" side of the rubber hydrochloride film than on the "air" side. When minimum amounts of syrup coalescent are used to effect maximum clarity and maximum heat-sealability, it is advantageous to apply the wrapper to the dried fruit with the "belt" side contacting the fruit.

The film is formed into a bag or tube and the dried fruit is introduced into it and the package is completed in any usual manner, usually by heat-sealing its mouth. The diisobutyl adipate slowly volatilizes at room temperature and will disappear from the package in several days after it is completed, depending upon the condition of storage of the packaged fruit. By the time the housewife receives the package, the diisobutyl adipate has substantially disappeared. As the diisobutyl adipate evaporates, the film gradually becomes more resistant to the passage of moisture vapor. Thus, this film is stronger during the packaging operation and through its shipping phase than later in its life because of its relatively high plasticizer content before the diisobutyl adipate evaporates. During storage and display, the wrapper becomes more moisture-resistant as the diisobutyl adipate evaporates.

Although the description refers more particularly to the packaging of prunes, the film forms an improved transparent packaging material for other dried fruits, including raisins, dates, figs, peaches, apricots, etc. The invention is especially effective on dried fruits shipped through or marketed in tropical or highly humid areas.

What we claim is:

1. Rubber hydrochloride film at least one surface of which includes a small amount of a polyethyleneglycol alkyl thioether which is a non-ionic surface-active agent with a molecular weight of substantially 422 to 462.

2. The film of claim 1 which contains in addition to said thioether between 5 and 12 parts of a permanent plasticizer per 100 parts of rubber hydrochloride and 0 to 7 parts of a fugitive plasticizer.

3. Rubber hydrochloride film which contains per 100 parts of the rubber hydrochloride, 7.5 parts of butyl stearate, 5 parts of diisobutyl adipate, and 2.5 parts of polyethyleneglycol tert-dodecylthioether, which is a non-ionic surface-active agent with a molecular weight of substantially 422 to 462.

4. Rubber hydrochloride film which contains per 100 parts of the rubber hydrochloride, 10 parts of butyl stearate and 2 parts of polyethyleneglycol tert-dodecylthioether, which is a non-ionic surface-active agent with a molecular weight of substantially 422 to 462.

5. Prunes packaged in transparent rubber hydrochloride film and in contact with the film, the contacting surface of the film including a small amount of a polyethyleneglycol alkyl thioether which is a non-ionic surface-active agent with a molecular weight of substantially 422 to 462.

6. Prunes packaged in a transparent bag of rubber hydrochloride film which film contains (1) a small amount of polyethylene glycol tert-dodecylthioether which is a non-ionic surface-active agent with a molecular weight of substantially 422 to 462 and (2) 5 to 12 parts of permanent plasticizer per 100 parts of rubber hydrochloride, and (3) 0 to 7 parts of a fugitive plasticizer.

7. Prunes packaged in a transparent bag of rubber hydrochloride film which film contains per 100 parts of the rubber hydrochloride, 7.5 parts of butyl stearate, 5 parts of diisobutyl adipate, and 2.5 parts of polyethyleneglycol tert-dodecylthioether which is a non-ionic surface-active agent with a molecular weight of substantially 422 to 462.

8. Prunes packaged in a transparent bag of rubber hydrochloride film which contains per 100 parts of the rubber hydrochloride, 10 parts of butyl stearate and 2 parts of polyethyleneglycol tert-dodecylthioether which is a non-ionic surface-active agent with a molecular weight of substantially 422 to 462.

References Cited in the file of this patent

UNITED STATES PATENTS

| 2,561,010 | Carson | July 17, 1951 |
| 2,561,011 | Carson | July 17, 1951 |
| 2,743,482 | Ferner | May 1, 1956 |
| 2,772,172 | Carson | Nov. 27, 1956 |

OTHER REFERENCES

Chemical Trade Names and Commercial Synonyms, Haynes TP 9 H39, second edition, p. 293.